June 16, 1953  J. A. KERR  2,641,902
COMBINATION RAM JET AND TORBOJET
Filed Sept. 13, 1947
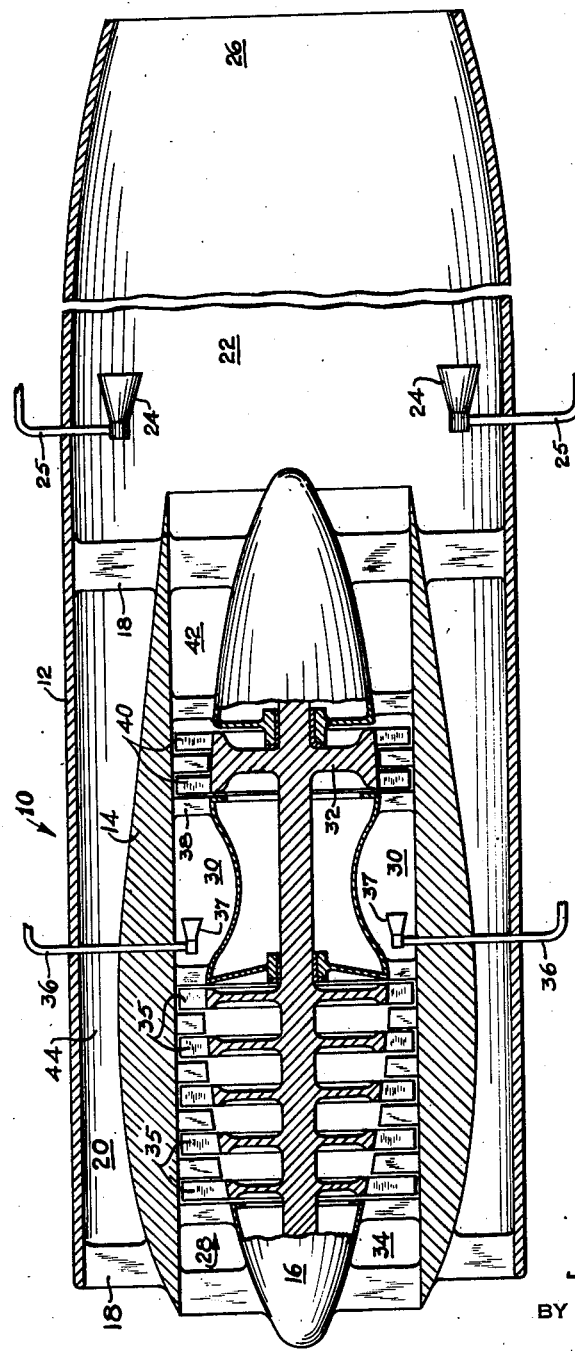
INVENTOR
JOHN A. KERR.
BY
ATTORNEY Patented June 16, 1953

2,641,902

UNITED STATES PATENT OFFICE 2,641,902

COMBINATION RAM JET AND TURBOJET

John A. Kerr, Columbus, Ohio, assignor to Curtiss-Wright Corporation, a corporation of Delaware Application September 13, 1947, Serial No. 773,785

2 Claims. (Cl. 60—35.6)

This invention relates to jet propulsion power plants for aircraft or other vehicles and is more particularly directed to a jet propulsion power plant comprising the combination of a turbo-jet and a ram jet.

A turbo-jet engine comprises an air compressor driven by a gas turbine, the high velocity jet exhaust from said turbine providing the engine with a forward propulsive thrust. This type of engine is relatively efficient in producing thrust at vehicle take-off and in sub-sonic air speed ranges but it loses its thrust efficiency at higher speeds.

A ram jet or athodyd engine comprises a duct into which air enters under pressure as the result of forward motion of the engine; fuel is mixed with said air and ignited; and the products of combustion discharge from the rear end of said duct at high velocity to provide the engine with forward propulsive thrust. This type of engine by itself provides no appreciable thrust at vehicle take-off and produces no appreciable thrust until high air speeds are attained.

An object of this invention comprises the provision of a combination turbo-jet and ram jet power plant having efficient operation at both low and high speeds of the aircraft or other vehicle being driven.

Another object of the invention comprises the provision of a combination turbo-jet and ram jet power plant such that the turbo-jet will so contribute to the operation of the ram jet that the thrust produced by the power plant, in the lower speed range, will exceed the sum of the thrusts of similar engines arranged independently of each other.

A still further object of the invention comprises the combination of a turbo-jet and a ram jet such that the exhaust from the turbo-jet ignites or helps to cause ignition of the combustion mixture in the ram jet.

Other objects of the invention will become apparent upon reading the annexed detail description in connection with the drawing which is a schematic axial sectional view through a power plant embodying the invention.

Referring to the drawing, a power plant 10 comprises a duct or hollow member 12. A central housing 14 for a turbo-jet engine 16 is concentrically supported within the duct 12 and at the forward end thereof—for example by radial arms or struts 18. The annular passage 20 between the housing 14 and the duct 12 comprises an air intake passage for a ram jet engine. Said ram jet includes a combustion chamber 22 to which fuel is supplied through suitable combination nozzles and flame holders 24 from fuel supply lines 25. The products of combustion discharge rearwardly at high velocity from the combustion chamber 22 through the rear discharge opening 26 in the duct 12, thereby providing the power plant 10 with forward thrust.

The turbo-jet engine 16 is disposed within the housing 14 and comprises an air compressor 28, a combustion chamber 30 and a turbine rotor 32 drivably connected to said compressor. The compressor 28 has a forwardly directed annular air inlet 34 and multi-stage blades 35 compress and deliver the compressed air into the combustion chamber 30. Fuel, from supply lines 36, is introduced into the combustion chamber 30 through combination nozzles and flame holders 37 for combustion in said chamber. Suitable igniter means—such as electric spark gaps (not shown)—are provided for ignition of the combustion mixture within the chamber 30. At the downstream end of the combustion chamber 30, a turbine nozzle box or guide vanes 38 direct the combustion gases against the blades 40 of the turbine rotor 32. As illustrated the turbine rotor is provided with first and second stage blades 40. From the turbine rotor blades 40, the turbine exhaust gases discharge rearwardly through an annular duct 42 into the combustion chamber 22 of the ram jet engine and thence out through the discharge opening 26 at the rear end of the housing 14, thereby providing the power plant 10 with additional forward thrust.

With this arrangement the turbo-jet engine 16 provides a fluid passage in parallel with the annular passage 20, said two passages joining together at their downstream ends to form a single third passage including the combustion chamber 22 and discharge opening 26. Also, as illustrated the turbine jet engine includes a multi-stage axial compressor 28 and a multi-stage turbine rotor 32. Obviously, however, the specific structure of said compressor and turbine rotor form no part of the present invention. If desired the turbo-jet engine may be provided with after-burning. That is, fuel may be added to the turbo-jet exhaust for combustion therein thereby adding to its thrust.

Instead of or in addition to the fuel introduced into the ram jet chamber 22, fuel may be introduced into the ram jet engine ahead of the discharge end of the turbo-jet engine. That is, ram jet fuel may be introduced into the annular passage 20 with all its combustion taking place downstream of the discharge end of the turbo-jet or with at least a part of its combustion taking place in the annular passage 20.

The temperature of the exhaust gases of the turbine 32 may be sufficient to cause ignition of the combustion mixture within the ram jet combustion chamber 22. In addition suitable igniter means—as for example electric spark gaps (not shown)—may be provided for insuring ignition within the ram jet combustion chamber 22. Even if the temperature of the turbine exhaust gases is not sufficiently high to cause ignition within the ram jet combustion chamber 22, the hot turbine exhaust gases will help to raise the temperature of the combustion mixture within said chamber 22 to its ignition temperature, thereby helping to maintain combustion within said chamber.

With the above construction, the turbo-jet engine provides forward propulsive thrust at vehicle take-off and low vehicle speeds. In addition at low vehicle speeds the ejector action of the turbine exhaust as it discharges from its housing 14 into the duct 12, draws air through the ram jet inlet passage 20 to increase the forward thrust on the aircraft or other vehicle. As a result the total forward thrust is greater than that which would be obtained were the turbo-jet and ram jet engines arranged independently of each other. As the vehicle speed increases the efficiency of the ram jet increases thereby providing the vehicle with efficient thrust producing means over a large speed range including take-off.

The annular intake passage 20, combustion chamber 22, and discharge opening 26 operate as a true ram jet. That is, air enters the passage 20 as the result of forward motion of the vehicle being driven and upon combustion in the chamber 22 the products of combustion discharge at high velocity out through the discharge opening 26 thereby providing forward propulsive thrust. Thus there are no rotatable blades, such as turbine or impeller blades, in the ram jet flow passages 20, 22 and 26. This is important, since with such rotatable blades the ram jet engine, as well as the turbo-jet engine, would be inefficient at high speeds. As used in the appended claims, the phrase "rotatable blades" is directed to means disposed within a fluid flow path which, upon rotation by said fluid, extract kinetic energy therefrom—as in the case of the blades of the turbine—or to means disposed within the flow path of a fluid which, upon enforced rotation by external means, impart kinetic energy to said fluid—as is the case of the blades of a compressor.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A jet propulsion power plant comprising a ram-jet engine and a turbo-jet engine; said ram-jet engine comprising an open-ended duct-like member having a forwardly directed air entrance opening at one end and a rearwardly directed exhaust nozzle at its other end; said ram jet engine also including means for introducing fuel into said duct-like member for combustion therein in a zone intermediate the ends of said duct-like member, the ram jet combustion gases discharging rearwardly through said nozzle to provide the power plant with substantial forward propulsive thrust; said turbo-jet engine being disposed at least substantially completely within said duct-like member and having a forwardly directed air entrance opening at one end and a rearwardly-directed axially-extending exhaust passage at its other end, the downstream end of said exhaust passage opening co-axially into the surrounding duct-like member upstream of said combustion zone so that the turbo-jet exhaust gases discharge into said duct-like member and thence through the exhaust nozzle of said duct-like member to provide the power plant with substantial forward propulsive thrust, said duct-like member being clear of all "rotatable blades" exteriorly of said turbo-jet engine.

2. A jet propulsion power plant comprising a ram jet engine and a turbo-jet engine; said ram-jet engine having an open-ended duct-like member with a forwardly directed air entrance opening at one end and a rearwardly directed exhaust nozzle at its other end and also having means for introducing fuel into said duct-like member for combustion therein in a zone intermediate the ends of said duct-like member, the passage provided by the ram-jet duct-like member for the ram jet air and combustion gases being clear of all "rotatable blades" and the ram jet combustion gases discharging rearwardly through said exhaust nozzle to provide substantial forward propulsive thrust for said power plant; said turbo jet engine having a forwardly directed air entrance passage, a compressor to which air is supplied from said entrance passage, a combustion chamber to which compressed air is delivered by said compressor for combustion with fuel therein, a turbine drivably connected to said compressor and arranged to be driven by the gases issuing from said chamber, and an exhaust passage for discharging the turbine exhaust gases rearwardly into said ram-jet duct-like member upstream of said combustion zone so that the turbine exhaust gases discharge through the exhaust nozzle of said duct-like member to provide substantial forward propulsive thrust for said power plant.

JOHN A. KERR.

References Cited in the file of this patent

UNITED STATES PATENTS

| Number | Name | Date |
| --- | --- | --- |
| 1,369,672 | Koenig | Feb. 22, 1921 |
| 2,396,911 | Anxionnaz et al. | Mar. 19, 1946 |
| 2,409,176 | Allen | Oct. 15, 1946 |
| 2,419,866 | Wilson | Apr. 29, 1947 |
| 2,432,359 | Streid | Dec. 9, 1947 |
| 2,482,505 | Pierce | Sept. 20, 1949 |
| 2,509,890 | Stalker | May 30, 1950 |
| 2,531,761 | Zucrow | Nov. 28, 1950 |
| 2,540,594 | Price | Feb. 6, 1951 |
| 2,542,628 | Christopher | Feb. 20, 1951 |
| 2,596,435 | Robert | May 13, 1952 |
| 2,610,465 | Imbert et al. | Sept. 16, 1952 |

FOREIGN PATENTS

| Number | Country | Date |
| --- | --- | --- |
| 612,362 | Germany | Apr. 18, 1935 |